(12) United States Patent
Bear

(10) Patent No.: US 6,532,660 B1
(45) Date of Patent: Mar. 18, 2003

(54) BACKLASH ADJUSTER WITH BEVEL GEAR FACE FOR ADJUSTMENT WITH MATING GEARED TOOL

(75) Inventor: Dee E. Bear, Columbia City, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/662,029

(22) Filed: Sep. 14, 2000

(51) Int. Cl.⁷ .............................................. B23P 15/14
(52) U.S. Cl. ........................................ 29/893.1; 29/893
(58) Field of Search ................ 29/893, 893.1; 74/409

(56) References Cited

U.S. PATENT DOCUMENTS

| | | | |
|---|---|---|---|
| 753,022 A | | 2/1904 | White |
| 792,690 A | | 6/1905 | Brush |
| 3,650,013 A | * | 3/1972 | Boers et al. ................. 29/893 |
| 3,715,936 A | * | 2/1973 | Jones ........................ 475/246 |
| 4,036,076 A | * | 7/1977 | Anderson ................... 74/409 |
| 4,261,218 A | * | 4/1981 | Eagan, Sr. ................... 74/409 |
| 4,338,853 A | * | 7/1982 | Neumeyer ................. 89/41.01 |
| 4,435,996 A | * | 3/1984 | Gorby ....................... 475/247 |
| 4,671,129 A | * | 6/1987 | Lovrenich .................. 74/370 |
| 4,700,582 A | * | 10/1987 | Bessette ..................... 74/409 |
| 4,763,542 A | * | 8/1988 | Darin ........................ 74/713 |
| 4,781,073 A | * | 11/1988 | Bondhus et al. ............. 74/440 |
| 4,805,284 A | * | 2/1989 | Obra ......................... 29/406 |
| 5,045,034 A | * | 9/1991 | Almeda, Jr. .................. 475/5 |
| 5,186,068 A | * | 2/1993 | Heller ........................ 74/425 |
| 5,269,731 A | * | 12/1993 | Scudder et al. ............. 475/230 |
| 5,289,635 A | * | 3/1994 | Martin et al. .............. 29/893.1 |
| 5,293,686 A | * | 3/1994 | Martin et al. .............. 29/893.1 |
| 5,624,345 A | * | 4/1997 | Graft et al. ................. 475/230 |
| 5,806,371 A | * | 9/1998 | Hibbler et al. ............... 74/409 |
| 5,988,977 A | * | 11/1999 | Gallagher et al. ......... 415/208.3 |
| 6,227,716 B1 | * | 5/2001 | Irwin ........................ 384/583 |
| 6,318,201 B1 | * | 11/2001 | Yoshioka ................... 74/424 |

* cited by examiner

Primary Examiner—Gregory M. Vidovich
Assistant Examiner—Essama Omgba
(74) Attorney, Agent, or Firm—Liniak, Berenato & White

(57) ABSTRACT

A bearing backlash adjuster for an axle assemby. A cylindrical body threadingly engages an inner surface of a housing wherein rotation of the cylindrical body causes longitudinal displacement relative to the housing. An opening is formed through the housing providing direct access to the cylindrical body. The cylindrical body has bevel gear teeth formed adjacent one end proximate the opening. A tool is inserted through the opening to directly engage the cylindrical body. By simply rotation the tool, the cylindrical body can be cooperatively rotation to cause the body to move to a desired position relative to the housing. The movement of the cylindrical body enables adjustment of backlash or preload to the differential bearings to which the cylindrical body engages. Once the backlash is properly positioned, a locking pin is inserted within the opening to engage the bevel gear teeth to lock the cylindrical body in place.

12 Claims, 2 Drawing Sheets

BACKLASH ADJUSTER WITH BEVEL GEAR FACE FOR ADJUSTMENT WITH MATING GEARED TOOL

BACKGROUND OF THE INVENTION

1. Field of the Invention

The present invention relates to the threaded differential bearing thrust support to be adjusted from outside of the carrier housing.

2. Description of the Prior Art

There has been a long felt need in the art for threaded adjusters for differential bearing pre-load. Many differentials have been made with no way to adjust bearing pre-load other than to assemble the differential with a prescribed number of shims and then check the ring and pinion alignment, if the alignment is incorrect, the differential must be disassembled, the shims changed and the differential reassembled. This type of pre-load adjustment system can be very time consuming, costly and frustrating for the person doing the assembly. An alternative to shims and trial and error are threaded adjusters, however, the current generation of threaded adjusters, are difficult to use, this has caused many artisans to have less than a proactive approach in implementing them. Currently, the only way to adjust the threaded adjusters present in the art is to go into the tube bore with a driver or modify the carrier casting with a window that would allow the use of a spanner type wrench for adjustment through the cover plate opening. These current adjustment devices are difficult and time consuming to use.

SUMMARY OF THE INVENTION

The present invention concerns the threaded bearing adjusters of differentials. Currently, adjusters can only be adjusted by placing their tools inside the tube or removing the cover plate. The instant invention overcomes this problem by providing a new type of threaded adjustment system. The threaded adjusters have a ring of teeth on the outer corner opposite of the bearing thrust surface similar to the teeth found on a drill chuck or side gear. The carrier has a hole/opening bored that is slightly outboard of the adjuster face and is perpendicular to the axial movement of the adjuster. Into this hole the adjuster tool; a tool similar to a drill chuck key or pinion mate, is inserted and engages the teeth in the adjuster ring. By turning the adjuster tool the threaded adjuster will turn and move axially as required to set the backlash and pre-load.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OP THE PREFERRED EMBODIMENT

Figure 2:
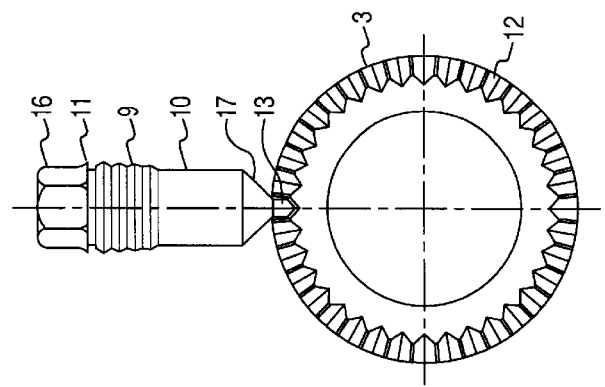
FIG. 2 is a front view of a threaded backlash adjuster engaged with the locking pin of the present invention in the locked position.
Figure 1:
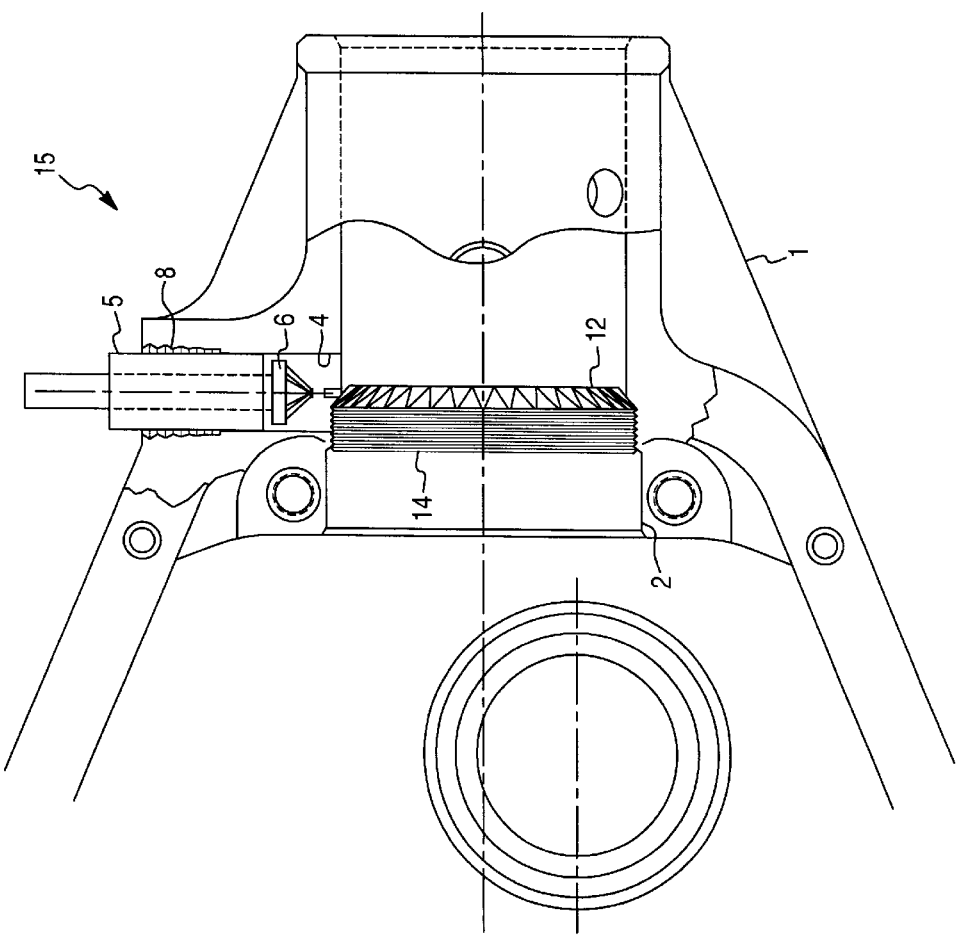
FIG. 1 is a sectional view of a differential housing assembly incorporating the present invention with the backlash adjuster tool partially inserted into the differential housing.

The present invention is directed to a bearing adjuster for a differential. The threaded adjuster 3 is a cylindrical body having threads on the outer surface. The adjuster 3 also has a ring of teeth 12 on the outer corner; opposite of a bearing thrust surface 14. The teeth are similar to the kind found on a drill chuck or side gear, commonly referred to as bevel gear type teeth. The carrier housing has a hole/opening 4 that is slightly outboard of the adjuster face and is perpendicular to the axial movement of the adjuster. The hole may be equipped with threads 8 to secure locking pin 11. Into this hole the backlash adjuster tool 15 may be inserted. The tool 15, which is similar to a drill chuck key or pinion gear, is engages the teeth in the adjuster ring.

The backlash adjuster tool includes an alignment sleeve 5, which centers drive shaft 7 in the hole 4. Drive shaft 7 is equipped with drive head 6. Drive head 6 is equipped with bevel gear type teeth which meshingly engage the teeth 12 of adjuster 3. By turning the drive shaft 7 of the adjuster tool 15 the threaded adjuster 3 will turn and move axially/longitudinally as required to set the backlash and pre-load.

The locking pin 11 is equipped with a gripable head 16. The gripable head is typically hex shaped for griping with a box end wrench or other suitable means. Below the gripable head is a threaded portion 9 for threaded engagement with threads 8 in hole 4. Below threaded portion 9 is spacer shaft 10. Spacer shaft 10 has a narrowed portion 17, which connects to locking pin 11. Tooth 13 engages teeth 12 of threaded adjuster 3 to prevent unwanted rotation of threaded adjuster 3, after the backlash adjuster tool 15 is removed.

Typically, after the differential mechanism (not shown) is installed in the differential housing 1 the loss of differential bearing pre-load may be caused by pressing the tubes in the differential housing after the differential has been installed. This system will allow the Assembly Department to set the pre-load after the tubes have been pressed into the carrier.

The Assembly Department, after inspecting the differential and determining it needs adjustment will remove locking pin 11, using a box end wrench or other suitable means. After the locking pin is removed, the adjuster tool 15 is inserted in to hole 4. During insertion, the alignment sleeve 5 aligns driveshaft 7 so that drive head 6 may properly engage teeth 12 of threaded adjuster 3. Drive shaft 7 is then rotated until the proper backlash is attained. After the proper backlash/desired position is attained the adjuster tool is removed and locking pin 11 is reinserted causing locking tooth 13 to engage teeth 12 and prevent any further rotation of adjuster 3 and locking the adjuster 3 in place.

Figure 3:
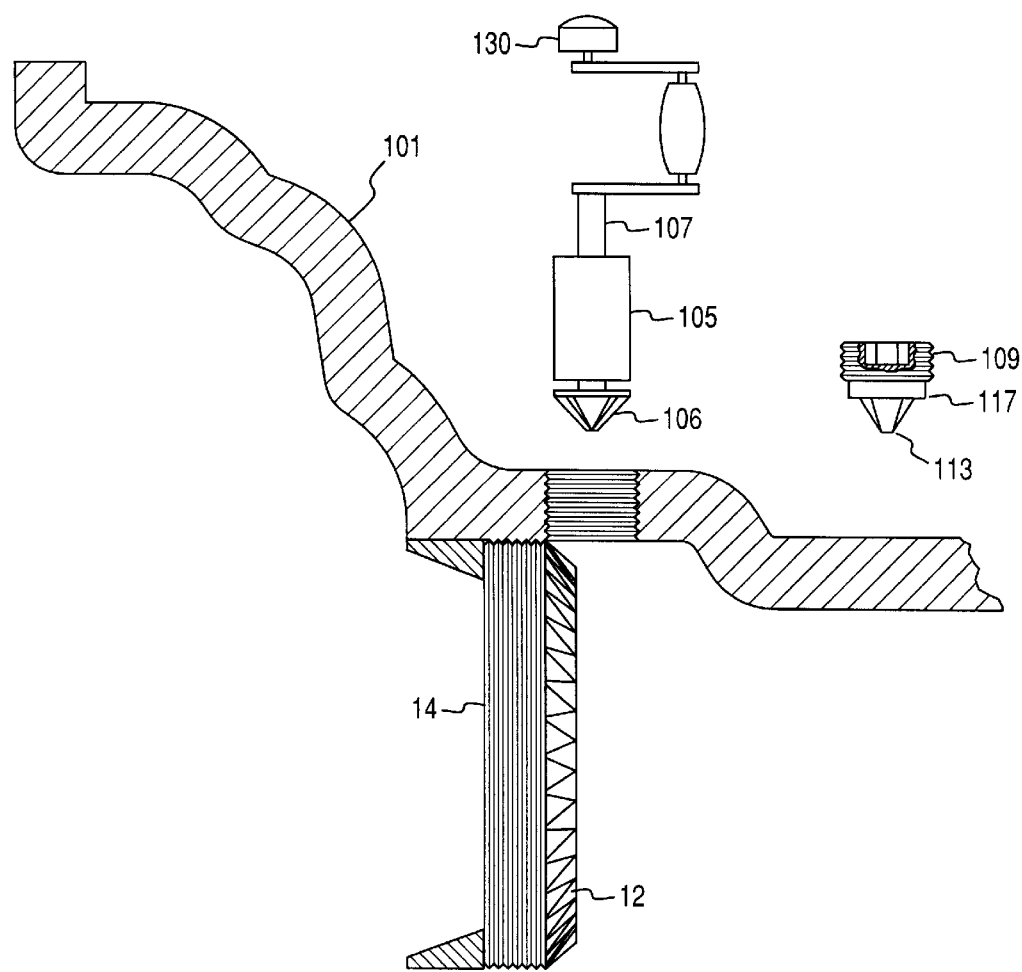
FIG. 3 is a sectional side view of a differential assembly incorporating the present invention with the backlash adjuster tool removed from the differential housing.

While the foregoing invention has been shown and described with reference to a preferred embodiment, it will be understood by those possessing skill in the art that various changes and modifications may be made without departing from the spirit and scope of the invention. For example, as depicted in FIG. 3, the tool may have a crank handle 130 secured to the drive shaft 107 which is rotatably disposed within the alignment sleeve 105. Similarly, a locking plug 117 may be employed where the bevel gear teeth 12 are positioned proximate a thinner portion of the housing 101.

What is claimed is:

1. A backlash adjuster assembly comprising:
   a housing having an opening providing access to within said housing;
   a cylindrical body disposed within and threadingly engaging said housing provided to adjust a position of said cylindrical body relative to said housing upon relative rotation therebetween, said cylindrical body having teeth disposed on an outer surface thereof positioned proximate said opening of said housing.

2. The backlash adjuster assembly according to claim 1, in combination with a mating tool having a drive head, wherein said mating tool is removably inserted within said opening of said housing and said drive head engages said teeth where rotation of said mating tool causes rotation of said cylindrical body relative to said housing.

3. The backlash adjuster according to claim 2, in combination with a locking member adapted to engage said teeth of said cylindrical body and prevent rotation of said cylindrical body relative to said housing, said opening in said housing being is sized no larger than to facilitate penetration of one of said locking member and said mating tool to engage said teeth of said cylindrical body, said locking member further provided with a portion to engage said housing and plug said opening.

4. The backlash adjuster according to claim 2, wherein said teeth of said cylindrical body are bevel gear teeth adapted to cooperatively engage said bevel gear teeth of said mating tool, said mating tool includes a substantially longitudinal portion extending along an axis thereof and through said opening and within said housing, whereby rotation of said mating tool about said axis causes said cylindrical body to rotate relative to said housing to adjust said position, said mating tool having a portion remaining external to said housing for operating said mating tool external to said housing.

5. The backlash adjuster assembly according to claim 1, wherein said teeth of said cylindrical body are bevel gear teeth.

6. The backlash adjuster assembly according to claim 1, said assembly further comprising:
   a locking pin disposed within said opening and secured to said housing, said locking pin engaging said teeth of said cylindrical body to prevent rotation of said cylindrical body relative to said housing.

7. The backlash adjuster assembly according to claim 6, wherein said locking pin extends through said housing and remains at least partially exposed external to said housing.

8. The backlash adjuster according to claim 7, wherein said locking pin is formed as a substantially longitudinally extending member having a grippable hex shaped head end portion provided for engaging a wrench external to said housing, said grippable hex shaped head end portion being connected to a threaded portion threadingly engaging said housing, said threaded portion in turn being connected to a spacer shaft portion which in turn being connected to a locking peg engaging said teeth of said backlash adjuster.

9. The backlash adjuster assembly according to claim 1, wherein said teeth of said cylindrical body are disposed proximate an inner portion of said housing adjacent said opening, said assembly further comprising:
   a plug to close said opening in said housing and having a portion to engage said teeth of said cylindrical body to prevent rotation of said cylindrical body relative to said housing.

10. A backlash adjuster assembly in combination with a mating tool having a drive head, said adjuster assembly comprising:
   a housing having an opening providing access to within said housing;
   a cylindrical body disposed within and threadingly engaging said housing provided to adjust a position of said cylindrical body relative to said housing upon relative rotation therebetween, said cylindrical body having bevel gear teeth disposed on an outer surface thereof positioned proximate said opening of said housing;
   wherein said mating tool is removably inserted within said opening of said housing and said drive head engages said teeth where rotation of said mating tool causes rotation of said cylindrical body relative to said housing; and said drive head comprises bevel gear teeth to cooperatively engage said bevel gear teeth of said cylindrical body.

11. A backlash adjuster assembly in combination with a mating tool having a drive head, said adjuster assembly comprising:
   a housing having an opening providing access to within said housing;
   a cylindrical body disposed within and threadingly engaging said housing provided to adjust a position of said cylindrical body relative to said housing upon relative rotation therebetween, said cylindrical body having bevel gear teeth disposed on an outer surface thereof positioned proximate said opening of said housing;
   wherein said mating tool is removably inserted within said opening of said housing and said drive head engages said teeth where rotation of said mating tool causes rotation of said cylindrical body relative to said housing; and said mating tool including;
   an alignment sleeve disposed within said opening of said housing; and
   a drive shaft having said drive head secured to an end thereof, said drive shaft disposed within said alignment sleeve for alignment within said opening.

12. A backlash adjuster in combination with a tool for adjusting said backlash adjuster, said combination comprising:
   a housing having an opening;
   a cylindrical body having a threaded outer surface threadingly engaging said housing to permit longitudinal displacement upon relative rotation therebetween, and bevel gear teeth disposed on said outer surface proximate said opening; and
   a tool for adjusting said backlash adjuster having;
      an alignment sleeve removably disposed within said opening of said housing;
      a drive shaft rotatably disposed within said alignment sleeve; and
      a drive head disposed on one end of said drive shaft and meshing with said bevel gear teeth of said cylindrical body, wherein rotation of said drive shaft cooperatively causes said cylindrical body to rotate relative to said housing to displace said backlash adjuster to a desired position relative to said housing.

* * * * *